US012425770B1

(12) United States Patent
Walters

(10) Patent No.: US 12,425,770 B1
(45) Date of Patent: Sep. 23, 2025

(54) MAGNETIC AUDIO DISTORTION DEVICE

(71) Applicant: Spencer James Walters, San Francisco, CA (US)

(72) Inventor: Spencer James Walters, San Francisco, CA (US)

( * ) Notice: Subject to any disclaimer, the term of this patent is extended or adjusted under 35 U.S.C. 154(b) by 0 days.

(21) Appl. No.: 19/248,353

(22) Filed: Jun. 24, 2025

Related U.S. Application Data

(60) Provisional application No. 63/734,695, filed on Dec. 16, 2024.

(51) Int. Cl.
*H04R 3/08* (2006.01)

(52) U.S. Cl.
CPC .................................... *H04R 3/08* (2013.01)

(58) Field of Classification Search
CPC ... H04R 3/08; H04R 3/04; H04R 5/04; H03G 9/18; H03G 9/005; G10H 1/16; G10H 3/187; G10H 2210/311
USPC ........................................................ 381/94.1
See application file for complete search history.

(56) References Cited

U.S. PATENT DOCUMENTS 2,351,004 A 6/1944 Camras
4,675,615 A * 6/1987 Bramanti ............... G01R 33/04 336/20

OTHER PUBLICATIONS

Mancini, Ron & Palmer, Richard; Sine-Wave Oscillator; Application Report SLOA060 Mar. 2001; 21 pages; Texas Instruments, Dallas TX, USA, pp. 1-21.
Mcnight, John G. Biasing in Magneic Tape Recordings; Aug. 1967; Electronics World, pp. 34-37.
Alferink, Freddy, Measuring the Magnetic Hysteresis; Sep. 2013; Webpage: Meettechniek.info "How to do electronic measurements", 13 pages.

* cited by examiner

*Primary Examiner* — Paul Kim
(74) *Attorney, Agent, or Firm* — Matthew Kaser; Adam Warwick Bell

(57) ABSTRACT

A magnetic audio distortion device is provided which produces consistent levels of magnetic flux, non-linear hysteresis, or saturation across the audio spectrum using soft magnetic materials in electromagnetic components such as, for example, transformers or inductors. The device comprises an audio signal connected to an amplified electromagnetic network comprising an electromagnetic component capable of creating non-linear hysteresis and a series resistance. The output of the amplified electromagnetic network is approximately the derivative of the magnetic flux in the electromagnetic component. The output of the network is integrated, producing the magnetic flux in the magnetic core. The output of the system is magnetically distorted consistently across all audio frequencies. The magnetic audio distortion device provides the sonic characteristic of magnetic audio tape without requiring mechanical apparatus or hard magnetic materials enabling the sonic characteristics of magnetic tape in a compact and reliable form.

14 Claims, 8 Drawing Sheets

Figure 4
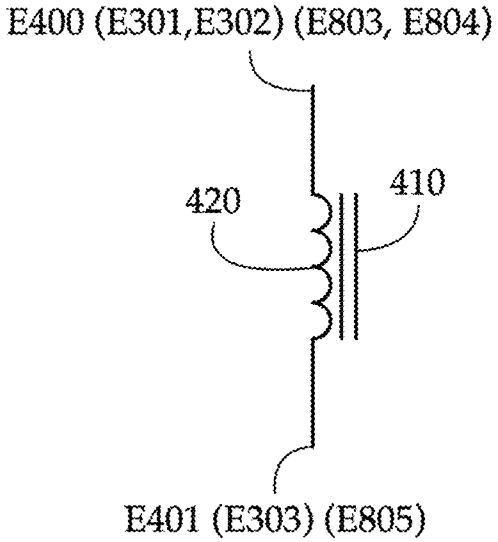
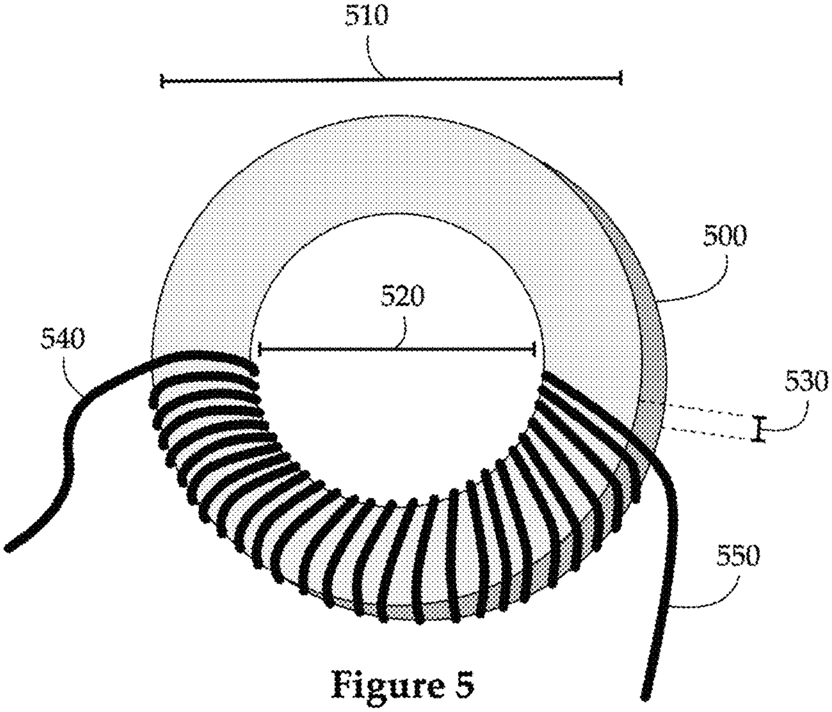
Figure 5

Figure 6
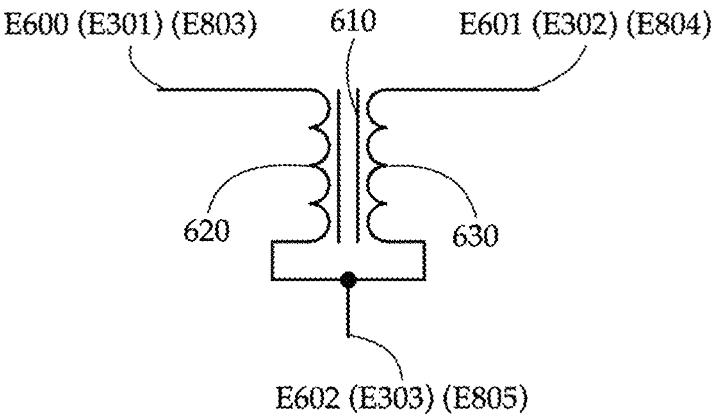
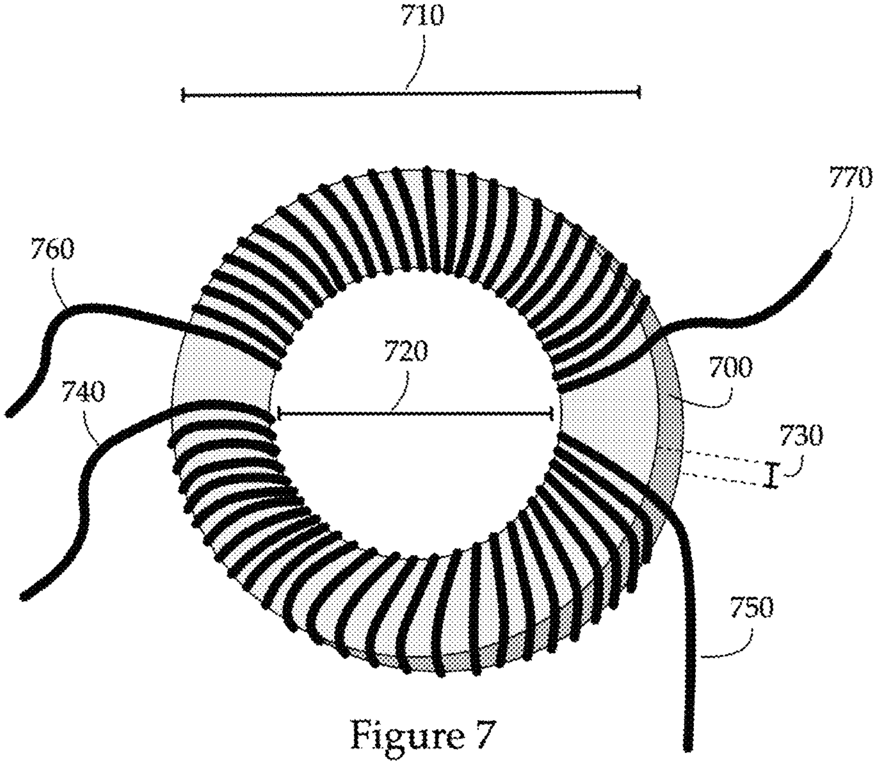
Figure 7

MAGNETIC AUDIO DISTORTION DEVICE

This application claims the benefit of priority to U.S. provisional application Ser. No. 63/734,695, filed Dec. 16, 2024, the content all of which is hereby incorporated by reference in its entirety.

BACKGROUND OF THE INVENTION

This invention relates generally to audio signal processing, and more particularly to audio distortion signal processing.

Magnetic distortion in audio is where an audio signal is distorted by non-linear magnetic hysteresis or magnetic saturation. In the history of audio recording and audio processing, audio signals have been affected by magnetic distortion through magnetic analog tape and audio transformers, where the distortion of magnetic analog tape is mostly frequency independent and the distortion of audio transformers is mostly frequency dependent. The distortion created by magnetic hysteresis is valued in audio for its sonic characteristic, which is typically described as softening transients and naturally compressing the dynamic range.

Magnetic materials exhibit magnetic hysteresis, as shown in FIG. 1. Element 100 is a major hysteresis loop that shows the magnetic flux density (B) in a material as a magnetic field strength (H) is applied. The initial magnetization curve 101 represents the B-field for increasing H when the material is initially demagnetized (B=H=0). The initial knee 102 of the curve has a lower slope than later portions of 101, and this nonlinearity introduces distortion in an audio signal. As the H-field continues to increase, the slope of the B-field decreases, a condition known as magnetic saturation, shown as 103 for positive H and 104 for negative H. The width of the hysteresis loop (100) and the slope of the initial knee (102) are primarily determined by the material's coercivity. Materials with high coercivity are considered magnetically "hard," and those with low coercivity are considered magnetically "soft." Hard magnetic materials are used in permanent magnets and storage media such as analog tape, while soft magnetic materials are used in the cores of transformers and inductors.

Before digital recording devices were in general use, magnetic analog tape was the dominant form of audio recording. The sound of magnetic analog tape is heard in most professional recordings from the 1950s to the 1990s. Digital recording became the standard for its accuracy and convenience. Analog tape recording has several disadvantages: 16 track analog tape recording requires a tape machine which can be as large as a refrigerator and weigh hundreds of kilograms; tape machines require regular mechanical and electronic maintenance; and the dynamic range of magnetic analog tape is typically 60 dB to 70 dB. In contrast: 16 track digital recording can be done with a 1U 19 inch rack audio interface; digital recording devices require little maintenance; and digital audio interfaces typically have a dynamic range greater than 100 dB. There are products in the audio market that attempt to emulate the sound of magnetic analog tape, but recording studios continue to use tape machines for the sonic characteristic of magnetic distortion.

U.S. Pat. No. 2,351,004 (to Camras, issued Jun. 13, 1944; '004 patent) presents an invention to improve the quality of magnetic recording by superimposing a rapidly fluctuating signal on an audio signal as a means to reduce distortion created by the initial knee 102 (36 in the '004 patent) of magnetic hysteresis 100 (44, 45 in the '004 patent) (see FIG. 1). U.S. Pat. No. 2,351,004 requires the use of mechanical equipment to move a medium made of hard magnetic material across a record head, and the information is stored in the magnetic medium when it loses physical contact with the record head. The information stored in the magnetic medium is reproduced on a reproduce head at a later point in time. It is not possible to instantaneously create the sonic characteristic of magnetic distortion due to the limitation of recording now and reproducing later.

Superimposing a rapidly fluctuating signal on the audio signal is a process now referred to as alternating current (AC) bias, and it became the standard process used for recording audio onto magnetic tape. The rapidly fluctuating signal is an ultrasonic signal with a frequency typically greater than 20 kHz. Magnetic analog tape recording has consistent levels of magnetic flux across the audio spectrum in order to record an audio signal with a mostly flat frequency response. To accurately emulate the magnetic tape recording process, consistent magnetic field levels are needed across the audio spectrum. If an ultrasonic AC bias signal is used as in U.S. Pat. No. 2,351,004, relatively consistent magnetic field levels for the relevant ultrasonic frequencies are needed as well.

Transformers are used in audio devices such as microphone preamps, equalizers, and compressors. The main purpose of transformers in audio devices is to receive and transmit balanced (differential) signals to reduce noise from electromagnetic interference (EMI) when a signal travels through a cable to a different audio device. Vintage audio devices are coveted for the sound of low frequency distortion created by magnetic hysteresis of their transformers, which are typically made from EI-50, EI-63, or EI-75 (similar or equivalent) electrical steel or nickel laminations to achieve high values of primary inductance and to reduce the possibility of magnetic saturation. These transformers are large and expensive to manufacture. The professional audio market continues creating products using large transformers with high inductances.

Lower inductances are seen as undesirable, because electrical current increases as inductance decreases. Decreasing inductance also decreases the level of low frequencies. The level decrease occurs because the inductance and source resistance of a transformer acts as a 6 dB/octave high pass filter on the voltage taken from a secondary winding, where the −3 dB corner frequency of the filter increases as either (a) source resistance increases or (b) inductance decreases. Perhaps surprisingly, this also results in a 6 dB/octave low pass filter on electrical current and its consequent magnetic field on a primary winding.

An inductor is a passive two-terminal electrical component that stores energy in a magnetic field when an electric current flows through it. Inductors are widely used in AC electronic equipment, particularly in passive filtering circuitry. They are used to block AC while allowing direct current (DC) to pass.

Prior magnetic audio distortion devices implement networks using electromagnetic components, such as transformers or inductors, having high inductances and large cores. The −3 dB corner frequency is typically below 500 Hz, resulting in a decreasing magnetic field above 500 Hz. The high inductance and large physical size of these magnetic components mitigate the possibility of creating consistent magnetic field levels across the audio frequency spectrum or saturating the magnetic core. To make matters worse, in the case of a 500 Hz corner frequency, the magnetic field at 20 kHz is attenuated by −32 dB, which essentially removes the possibility of applying AC bias as used in analog tape. Therefore, prior devices are unable to create frequency independent non-linear magnetic hysteresis across the audio frequency spectrum.

Thus, there is a need for a magnetic audio distortion device or system which can create consistent levels of magnetic flux and non-linear hysteresis across the audio frequency spectrum without requiring mechanical apparatus or hard magnetic materials.

SUMMARY OF THE INVENTION

The present invention relates to a magnetic audio distortion device or system that recreates non-linear magnetic hysteresis using soft magnetic materials in a frequency-independent manner across the full audio spectrum. The device or system is capable of recreating the magnetic behavior of magnetic tape recording using electromagnetic components such as transformers or inductors.

In one embodiment, an audio signal spanning a typical audio bandwidth (for example, 20 Hz to 20 kHz) is applied to an amplified electromagnetic network wherein the network comprises one or more electromagnetic components that exhibit non-linear hysteresis. The magnetizing H-field is substantially frequency independent across the audible range. The amplified electromagnetic network is driven by an amplifier.

In a preferred embodiment, the amplified electromagnetic network produces a signal that reflects the non-linear magnetic behavior of the core material in response to the input signal. This signal is then passed to an integrator, which performs a time-domain integration of the sensed voltage. Since the electromagnetic response is proportional to the time derivative of magnetic flux, this integration recovers the flux produced within the magnetic core.

The magnetic component may take the form of a transformer or inductor and may use commonly available ferrite materials such as MnZn or NiZn. Cores may be toroidal, rod-shaped, or other standard geometries (for example, EI, PQ, RM), but it is shown that any core shape is feasible. The invention is implemented with soft magnetic materials to ensure saturation and hysteresis behavior are modulated in real time.

In another embodiment, the magnetic audio distortion device comprises an optional high-frequency bias signal, typically greater than 20 kHz, which may be applied to the amplified electromagnetic network and superimposed on the audio signal. This bias signal serves to shift the operating point on the hysteresis curve of the magnetic material, enabling the signal to interact with a more linear portion of the B-H curve thereby reducing higher order and odd order harmonic distortion. The resulting output is a magnetically distorted analog signal.

Furthermore, a step-by-step design process is provided for creating an amplified electromagnetic network capable of generating non-linear hysteresis, allowing the invention to be adapted to a wide range amplifiers, core materials, and core shapes.

The invention achieves consistent magnetic flux density across the audio frequency spectrum and controlled distortion behavior across the audio spectrum, overcoming the frequency dependent limitations of traditional transformer saturation circuits.

In one embodiment, the magnetic audio distortion system comprises an input configured to receive an audio signal; an amplified electromagnetic network comprising at least one amplifier, a series resistance, and at least one electromagnetic component exhibiting non-linear magnetic hysteresis, the network configured to generate a substantially frequency-independent magnetizing field across the audio frequency spectrum up to at least 20 kHz; and an integrator electrically coupled to the output of the amplified electromagnetic network, the integrator configured to reconstruct a voltage corresponding to magnetic flux in the electromagnetic component, thereby producing a magnetically distorted output signal. In a preferred embodiment, the electromagnetic component comprises a magnetic core with a relative initial permeability of at least 4, an effective cross-sectional area of at least 0.49 $mm^2$, or a magnetic path length of at least 6 mm. In a preferred embodiment, the amplified electromagnetic network is configured to drive the core to magnetic saturation during normal operation. In another preferred embodiment, the series resistance of the amplified electromagnetic network is greater than or equal to the inductive reactance of the electromagnetic component at 20 kHz. In another preferred embodiment, at least one amplifier comprises one or more of: an integrated circuit operational amplifier, discrete transistors, vacuum tubes, and a digital-to-analog converter. In another preferred embodiment, the integrator comprises one or more of: active analog circuitry, passive circuitry, and digital signal processing.

In another embodiment, the amplified electromagnetic network further comprises a pre-emphasis filter configured to maintain consistent levels of magnetic flux in the electromagnetic component across the audio spectrum.

In another embodiment, the system further comprises an ultrasonic bias signal source configured to inject a bias signal into the amplified electromagnetic network, wherein the bias signal is at least 20 kHz and configured to shift the operating point along the magnetic hysteresis curve. In a preferred embodiment, the bias signal is between 20 kHz and 200 kHz. In another preferred embodiment, the bias signal is combined with the audio signal through one or more of: passive summing, active circuitry, digital domain summing, and inductive coupling.

In a second embodiment, the magnetic audio distortion device comprises an electronic closed circuit, the electronic closed circuit comprising an audio input signal, the audio input signal comprising a voltage; the electronic closed circuit further comprises an amplified electromagnetic network, the amplified electromagnetic network comprising at least one amplifier, at least one resistor, at least one variable resistor, and at least one electromagnetic component with hysteresis; and the electronic closed circuit further comprises an integrator, the integrator comprising at least one resistor and at least one capacitor. In a preferred embodiment, the audio input signal comprises an audio bandwidth having a range of between 20 Hz and 20 kHz. In another preferred embodiment, the audio input signal comprises a voltage range of within plus or minus (+/−) 16 V.

In another preferred embodiment, the electromagnetic component with hysteresis comprises a magnetic core with at least one coil winding.

In yet another preferred embodiment, the electronic closed circuit comprises at least one operational amplifier (op-amp). In a more preferred embodiment of the electronic closed circuit, the amplified electromagnetic network comprises a first operational amplifier and the integrator comprises a second operational amplifier. In another preferred embodiment, the first operational amplifier is capable of a supply voltage of 32 V, and further comprises a maximum current of at least 53 mA and a slew rate of at least ~10 V/μs. In another preferred embodiment, the second operational amplifier is capable of a supply voltage of 32 V, and further comprises a maximum current of at least 3 mA and a slew rate of at least 2 V/μs.

In a third embodiment, the electronic closed circuit of the second embodiment further comprises an ultrasonic input signal, the ultrasonic input signal having a frequency greater than 20 kHz.

In a fourth embodiment, the magnetic audio distortion device comprises an electronic closed circuit, the electronic closed circuit comprising an audio input electronic signal device, at least four resistors, at least one variable resistor, at least one capacitor, an electromagnetic component, wherein the electromagnetic component has a magnetic core comprising one or more windings; in one preferred embodiment, the electromagnetic component is selected from the group consisting of a transformer and an inductor. In a first preferred embodiment, the electronic closed circuit further comprises an ultrasonic input signal device. In a second preferred embodiment, the electronic closed circuit further comprises a digital ground. In a third preferred embodiment, the electronic closed circuit comprises a power source and at least one operational amplifier.

In another embodiment, the magnetic audio distortion device for providing consistent levels of magnetic flux and non-linear hysteresis across the audio spectrum, comprises: an audio input signal; an amplified electromagnetic network comprising an input and an output; an integrator comprising an input and an output; and electrical connections comprising: the audio input signal to the input of the amplified electromagnetic network, the amplified electromagnetic network further comprising: electrical connections comprising: a first end of a first resistor to the network input; a second end of the first resistor to the inverting input of a first operational amplifier and to a first end of a variable resistor; a second end of the variable resistor to the output of the first operational amplifier; the non-inverting input of the first operational amplifier to common; the output of the first operational amplifier to a first end of a second resistor; a second end of the second resistor to a first end of an electromagnetic component, wherein the electromagnetic component is selected from a group consisting of a transformer and an inductor and the first end of the electromagnetic magnetic component comprises a first end of an inductor or a first end of a transformer primary coil winding; an electromagnetic component output to the network output, wherein the electromagnetic component output comprises a first end of the inductor or a first end of a secondary coil winding of the transformer; an electromagnetic component common to common, wherein the electromagnetic component common comprises a second end of the inductor or both a second end of the transformer primary and a second end of the transformer secondary; and electrical connections: the output of the amplified electromagnetic network to the input of the integrator, the integrator further comprising: electrical connections comprising: a first end of a third resistor to the integrator input; a second end of the third resistor to: a first end of a capacitor; a first end of a fourth resistor; the inverting input of a second operational amplifier; the output of the second operational amplifier to: a second end of the capacitor; a second end of the fourth resistor; the integrator output; whereby the integrator output comprises a magnetically distorted output signal; and wherein said device provides consistent levels of magnetic flux and non-linear hysteresis across the audio spectrum.

In a more preferred embodiment, the electromagnetic component disclosed herein comprises a magnetic core, the magnetic core comprising a ferrite composite material and selected from the group consisting of a transformer and an inductor, means for conducting an electric current, said means helically wound around the magnetic core. In one embodiment, the magnetic core comprises a metallic compound suitable for generating magnetic flux. In a more preferred embodiment, the metallic compound is selected from the group consisting of a ferrous and a ferrite material. In a still more preferred embodiment, the ferrite material is a transition metal-ferrite compound material. Transition metals are known to those of skill in the art. In a still more preferred embodiment, the transition metal-ferrite compound material is selected from the group consisting of manganese and zinc.

In a preferred embodiment, means for conducting electrical current or conducting means are well known to those in the art and may include metal electrical conductors, the metal selected from the group consisting of copper, iron, gold, aluminum, silver, mercury, and bronze; they may include graphite and a salt solution.

In another preferred embodiment, the electromagnetic component comprises a substantially symmetrical regular shape, the substantially regular symmetrical shape selected from the group consisting of a torus, a rod, a square, a triangle, a polygon. In a most preferred embodiment, the substantially regular symmetrical shape is selected from the group consisting of a torus and a rod. In another embodiment, the core can take the form of standard transformer core shapes selected from the group consisting of EI laminations, C, E, EC, EER, EFD, EL, ELH, ELP, EP, EPC, EPO, EPX, EQ, ER, ETD, EV, HE, HER, I, multi-hole, P (pot), PLT (plate), PM, PQ, PS, RM, tube, U, UR.

In a preferred embodiment, the electrical connection between elements of the invention disclosed herein comprises an electrical-conductive material. In a more preferred embodiment, the electrical-conductive material is selected from the group consisting of a transition metal and carbon-graphite. In a more preferred embodiment, the electrical-conductive material is selected from the group consisting of silver, copper, gold, aluminum, beryllium, magnesium, cobalt, tungsten, molybdenum, rhodium, zinc, nickel, cadmium, iron, platinum, palladium, tin, chromium, niobium, lead, zirconium, titanium, mercury, and manganese. In a most preferred embodiment, the electrical-conducting metallic material is copper.

In an alternative embodiment, the magnetic audio distortion device as disclosed herein further comprises: an ultrasonic input signal; the amplified electromagnetic network further comprising a second input; and electrical connections: the ultrasonic input signal to the second input of the amplified electromagnetic network, the amplified electromagnetic network further comprising: electrical connections comprising: a first end of a fifth resistor to the second network input; a second end of the fifth resistor to the inverting input of a third operational amplifier and to a first end of a second variable resistor; a second end of the second variable resistor to the output of the third operational amplifier; the non-inverting input of the third operational amplifier to common; the output of the third operational amplifier to a first end of a sixth resistor; the inverting input of a fourth operational amplifier to: the second end of the second resistor, where the electrical connection connecting the second end of the second resistor to the first end of the electromagnetic component is omitted; the second end of the sixth resistor; a first end of a seventh resistor; a second end of a seventh resistor to the output of the fourth operational amplifier; the non-inverting input of the fourth operational amplifier to common; the output of the fourth operational amplifier to a first end of an eighth resistor; the second end of an eighth resistor to the first end of the electromagnetic component, whereby the integrator output comprises a magnetically distorted output signal and wherein said device provides consistent levels of magnetic flux and non-linear hysteresis across the audio spectrum where the region of operation on the non-linear hysteresis of the electromagnetic component is altered by the ultrasonic input signal.

In another embodiment the magnetic audio distortion device capable of generating an audio signal voltage, wherein the device comprises an amplified electromagnetic network comprising a resistive component and an electromagnetic component connected to an audio signal voltage which is amplified in an inverting amplifier. In one embodiment, the audio signal voltage level is varied with a variable resistor in the inverting amplifier's feedback loop, whereby the reactance is less than five times the resistance at the maximum audio frequency of the audio spectrum (20 kHz). In another embodiment the magnetic field strength of the maximum audio frequency is 97.8% (−0.2 dB) of the magnetic field strength at DC (direct current).

In one embodiment, the resistance component comprises at least one resistor. In another embodiment, the electromagnetic component comprises a magnetic core, wherein the magnetic core may comprise a transformer, or in the alternative, an inductor. In a preferred embodiment, the magnetic core may comprise a composite material in the shape of a torus.

In one embodiment, an amplified electromagnetic network creates non-linear hysteresis consistently at all audio frequencies. In one embodiment, the output of the amplified electromagnetic network is the derivative of the magnetic flux in the magnetic core. In a preferred embodiment, the output signal is integrated, producing an integrated output signal which is the magnetic flux in the magnetic core, whereby the output is a magnetically distorted version of the audio input signal.

In a second embodiment, the invention provides an amplified electromagnetic network comprising a resistance component and an electromagnetic component connected to an ultrasonic signal superimposed on an audio signal input in a summing amplifier. In one embodiment, the audio signal is amplified by a first inverting amplifier, where the audio signal level is varied with a first variable resistor in the first inverting amplifier's feedback loop, whereby the first inverting amplifier is connected to the summing amplifier through a first resistor. In one embodiment, the ultrasonic signal is amplified by a second inverting amplifier, whereby the ultrasonic signal level is varied with a second variable resistor in the second inverting amplifier's feedback loop. In another embodiment, the second inverting amplifier is connected to the summing amplifier through a second resistor, whereby the reactance is less than five times the resistance at the maximum audio frequency of the audio spectrum. In one embodiment, the electromagnetic component is a part of an amplified electromagnetic network comprising a magnetic core, wherein the magnetic core creates non-linear hysteresis consistently at all audio frequencies. In one embodiment, the output of the amplified electromagnetic network is the derivative of the magnetic flux in the magnetic core. In a preferred embodiment, the output signal is integrated, producing an integrated output signal which is the magnetic flux in the magnetic core, whereby the output is a magnetically distorted version of the audio input signal.

In another embodiment, the magnetic field strength of the maximum audio frequency is 97.8% (−0.2 dB) of the magnetic field strength at DC (direct current) whereby the magnetic flux and non-linear hysteresis of the magnetic core in the amplified electromagnetic network is consistent at all audio frequencies. In a further embodiment, the output of the amplified electromagnetic network is the derivative of the magnetic flux in the magnetic core whereby the output signal is integrated, producing an integrated output signal which is the magnetic flux in the magnetic core, and whereby the output of the second embodiment is magnetically distorted version of the audio input signal. Furthermore, AC bias is used wherein AC bias reduces harmonic distortion from linearizing the transfer of energy within the magnetic core; the effect of AC bias on Total Harmonic Distortion (THD) is demonstrated.

In one preferred embodiment, the first electromagnetic component may be a toroidal transformer comprising a magnetic material having a minimum relative initial permeability of at least 4, for example, a transition metal ferrite composite material. In another embodiment, the second electromagnetic component used in the second embodiment may be a toroidal inductor-comprising a magnetic material having a minimum relative initial permeability of at least 4, for example, a transition metal ferrite composite material. In the alternative, the toroid comprises a metalloid-ferrite composite material.

In another embodiment, the invention provides a method of using a magnetic audio distortion device for providing consistent levels of magnetic flux and non-linear hysteresis across the audio spectrum. The method comprises the steps of: (a) providing an audio signal, wherein the audio signal is selected from the group consisting of a live audio, a sonic vocalization, a microphone signal, an acoustic musical instrument audio, an electric musical instrument signal, a synthesizer signal, a sound generator signal, a signal generator, or a transformer signal; (b) inputting the audio signal into a provided magnetic audio distortion device, the magnetic audio distortion device comprising an electronic closed circuit, the electronic closed circuit comprising an audio input electronic signal device, an ultrasonic audio input electronic signal device, at least four resistors, at least one variable resistor, at least one operational amplifier, at least one capacitor, an electromagnetic component, wherein the electromagnetic component is selected from the group consisting of a transformer and an inductor; (c) applying AC bias to the soft magnetic core, thereby reducing higher order distortion; (d) varying the audio signal using at least one variable resistor, thereby controlling the intensity and shape of magnetic distortion across the across spectrum, and (e) providing a sonic shaping tool for use in audio recording.

In an alternative embodiment the method comprises the further steps of (f) providing the magnetic audio distortion device further comprising an ultrasonic audio input electronic signal device, wherein the ultrasonic audio input electronic signal device provides an ultrasonic bias signal having a frequency greater than 20 kHz; (g) superimposing the ultrasonic bias signal on the audio signal.

The invention provides a further method for processing an audio signal input to create consistent levels of magnetic flux and non-linear hysteresis across the audio frequency spectrum, and wherein an output signal is a magnetically distorted audio output signal, the method comprising (a) providing a magnetic audio distortion device; (b) inputting a first audio signal, the first audio signal comprising an audio signal frequency of between 20 Hz and 20 kHz; (c) applying the first audio signal to an amplified electromagnetic network wherein the amplified electromagnetic network comprises one or more electromagnetic components, the electromagnetic components comprising a core material, the core material exhibiting non-linear hysteresis, and wherein the amplified electromagnetic network produces a second audio signal that reflects the non-linear magnetic behavior of the core material in response to the input first audio signal, and wherein the voltage of the second audio signal is proportional to the time derivative of magnetic flux of the core material; (d) passing the second audio signal to an integrator, wherein the integrator senses the voltage of the second audio signal; and (e) performing a time-domain integration of the sensed voltage, wherein the integration recovers a flux produced within the core material, thereby producing a magnetically distorted audio output signal. In a preferred embodiment, the method further comprises adjusting the amplitude of the first audio signal in real time in response to a user control input, wherein the adjustment varies the distortion characteristics of the output signal.

In another embodiment, the method further comprises recreating a process of AC-bias used to reduce distortion in magnetic tape audio recording, the method comprising: (f) inputting an ultrasonic signal for bias injection, the ultrasonic signal comprising an audio frequency of greater than 20 kHz; (g) combining the ultrasonic signal with the second audio signal in the amplified electromagnetic network, thereby allowing precise control of an operating point of non-linear hysteresis of the core material, and achieving consistent magnetic field levels across the audio frequency spectrum and controlled distortion behavior across the audio frequency spectrum; and (h) recreating the process of AC-bias used to reduce distortion in magnetic tape recording. In a preferred embodiment, the method comprises wherein the ultrasonic signal is a high-frequency bias signal superimposed upon the second audio signal in the amplified electromagnetic network, whereby the high-frequency bias signal shifts the operating point of non-linear hysteresis of the core material and enabling the second audio signal to interact with a more linear portion of the B-H curve of the core material, thereby reducing higher order and odd order harmonic distortion. In another preferred embodiment, the method further comprises adjusting the amplitude of the ultrasonic signal in real time in response to a user control input, wherein the adjustment varies the distortion characteristics of the output signal.

In another further embodiment, the magnetic audio distortion device or system herein disclosed wherein the series resistance of the amplified electromagnetic network is greater than or equal to an inductive reactance of the electromagnetic component at 1 kHz, and wherein the amplified electromagnetic network further comprises a pre-emphasis filter configured to maintain consistent levels of magnetic flux in the electromagnetic component across the audio spectrum.

In another further embodiment, the magnetic audio distortion device or system herein disclosed wherein the amplifier is selected from the group consisting of an integrated circuit operational amplifier, discrete transistors, vacuum tubes, and a digital-to-analog converter.

In another further embodiment, the magnetic audio distortion device or system herein disclosed wherein the bias signal is combined with the audio signal passively with resistive or reactive components; alternatively wherein the bias signal is combined with the audio signal electronically via active circuitry comprising resistive or reactive components; alternatively wherein the bias signal is combined with the audio signal in the digital domain prior to analog conversion; alternatively wherein the bias signal is combined with the audio signal inductively.

In another further embodiment, the magnetic audio distortion device or system herein disclosed wherein the integrator is selected from the group consisting of active electronic circuitry, only passive circuitry, and digital signal processing.

In some embodiments, an electromagnetic design methodology is used to specify an amplified electromagnetic network.

Definitions

Audio signal: A signal containing frequency components typically within the audible range, approximately 20 Hz to 20 kHz. The audio signal may originate from a microphone, musical instrument, synthesizer, signal generator, or other analog, electronic, or digital source.

Ultrasonic signal: A signal with frequency components greater than or equal to 20 kHz, used to modulate the operating point of a magnetic material exhibiting non-linear hysteresis. The signal may originate from an analog, electronic, or digital source.

Electromagnetic component: A component such as an inductor or transformer comprising a magnetic core and at least one coil winding. The component exhibits magnetic hysteresis and has an inductance.

Magnetic core: A magnetic material around which a coil is wound. It may be made from soft magnetic materials such as MnZn or NiZn ferrites, and may take any suitable shape, including but not limited to toroidal, rod, or laminated forms. The invention is not limited to any particular core geometry.

Magnetizing field (H): Also known as the magnetic field strength, it is the field applied to a magnetic material to induce magnetic flux, typically measured in amperes per meter (A/m).

Magnetic flux density (B): The magnetic flux per unit area within a magnetic material, typically measured in teslas (T). It is related to the magnetizing field and the material's permeability.

Initial permeability ($u_i$): The relative permeability of a magnetic material, defined with respect to the vacuum permeability $u_0=4\pi\times10^{-7}$ Henries per meter (H/m). It represents the slope of the magnetization curve at low magnetic field strength.

Magnetic hysteresis: The non-linear relationship between magnetic flux density B and magnetizing field H in magnetic materials, often depicted as a loop in the B-H plane. This phenomenon introduces audio distortion valued for its tonal coloration.

Saturation: The condition in a magnetic material where further increases in H produce minimal increases in B, due to full alignment of magnetic domains.

Amplified electromagnetic network: A circuit comprising an amplifier, series resistance, and an electromagnetic component, configured to produce a magnetizing field in response to an input audio signal. The network is designed to ensure consistent field strength across frequency and to induce non-linear hysteresis.

Integrator: A circuit that reconstructs magnetic flux by integrating the voltage induced by changes in magnetic flux density. May be implemented using active electronics, passive networks, or digital signal processing.

AC bias: The process of injecting an ultrasonic signal into the amplified electromagnetic network to shift the operating point along the hysteresis curve, thereby reducing distortion caused by the non-linear initial magnetization region.

Corner frequency ($f_c$): The −3 dB point in a low-pass or high-pass filter.

BRIEF DESCRIPTION OF THE DRAWINGS

FIG. 4 is the schematic of an inductor having a magnetic core.

FIG. 5 is a diagram of a toroidal inductor.

FIG. 6 is the schematic of a transformer having a magnetic core.

FIG. 7 is a diagram of a toroidal transformer.

Figures are provided for illustrative purposes only and are not limiting.

DETAILED DESCRIPTION OF THE INVENTION

In accordance with the invention, a magnetic audio distortion device is provided which produces consistent levels of magnetic flux and non-linear hysteresis across the audio spectrum using soft magnetic materials in electromagnetic components such as transformers or inductors.

Figure 2:
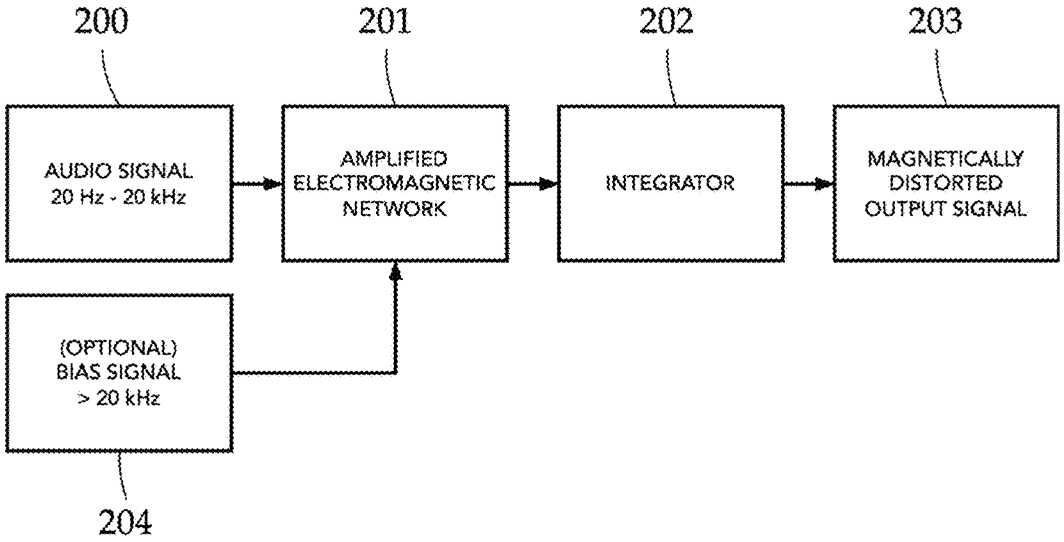
FIG. 2 is a system level diagram comprising the minimum set of required and optional functional blocks of the invention.

In a first embodiment, a magnetic audio distortion device comprises an audio input signal, an amplified electromagnetic network, an integrator, a magnetically distorted output signal, and an optional bias input signal. FIG. 2 provides a functional overview. An audio signal 200 is processed through an amplified electromagnetic network 201, where it is transformed by a non-linear magnetic response, then integrated at 202 to produce a magnetically distorted output 203. An optional bias signal 204 may be introduced to improve linearity via modulation of the working region on the hysteresis curve.

An audio signal 200, which may be a full-bandwidth signal in the range of approximately 20 Hz to 20 kHz, is provided as input to the system. This signal is applied to an amplified electromagnetic network 201. The network comprises one or more magnetic components (for example, transformers or inductors). There is a resistance in series with one or more windings of the magnetic component. In one configuration, the series resistance is greater than or equal to the inductive reactance of the magnetic windings at 20 kHz, resulting in a magnetizing H-field that is substantially frequency-independent across the audio band. This condition mitigates the H-field low-pass filtering typically introduced by inductive elements.

In some configurations, the H-field low-pass filtering may be compensated by including a pre-emphasis stage in the amplified electromagnetic network. In these configurations, the resistance may be up to twenty times lower than the inductive reactance at 20 kHz. With this impedance relationship, the frequency response of the H-field in the electromagnetic network is a low pass filter with the corner frequency in the audible range as low as 1 kHz. A relatively flat frequency response is achieved by applying a frequency-dependent gain stage to the audio signal to pre-emphasize higher frequencies, such that the resulting magnetizing H-field remains substantially flat across the audio band after attenuation by the low pass filter of the electromagnetic network. This may be accomplished with a shelving filter, equalization network, or analog or digital signal processing that imparts a compensatory gain slope to yield a relatively flat H-field response at the output of the amplified electromagnetic network. The inclusion, configuration, and placement of pre-emphasis circuitry are implementation-dependent and not required for all embodiments.

The amplified electromagnetic network 201 has an amplifier to drive the series resistance and inductive reactance. In one embodiment, the amplifier may be an integrated circuit operational amplifier. In another embodiment, the amplifier is built from discrete components such as transistors or vacuum tubes. In another embodiment, the amplifier is a hybrid arrangement consisting of an integrated circuit amplifier and discrete transistors or vacuum tubes. In another embodiment, the audio signal is a digitally sampled (for example, digital) signal, and the amplifier may be a digital-to-analog converter capable of driving the series resistance. The amplifier may be any circuit capable of driving the load presented by the electromagnetic network and maintaining the required slew rate across the audio range.

The amplified electromagnetic network 201 contains a magnetic material that exhibits hysteresis 100 (FIG. 1), such that the relationship between magnetizing field H and magnetic flux density B is non-linear. This non-linearity presents as harmonic distortion, similar to that observed in recording magnetic media.

An optional high-frequency bias signal 204 may be combined with the input audio signal. This bias signal is typically greater than 20 kHz and is used to modulate the operating point of the magnetizing field such that the composite signal traverses a more linear region of the magnetic hysteresis curve. This mechanism is analogous to AC (alternating current) bias in magnetic tape recorders and improves fidelity by reducing higher order distortion caused by the initial knee 102 of hysteresis. The audio signal and optional bias signal may be combined using a variety of methods. In one embodiment, the signals are summed passively using a resistive network or coupling capacitors. In another embodiment, they are summed actively using an analog summing amplifier or mixer stage. In yet another embodiment, the audio and bias signals may be numerically summed within a digital signal processing (DSP) system or microcontroller prior to being converted to analog form by a digital-to-analog converter. In still another embodiment, the audio and bias signals may be summed magnetically using inductive coupling techniques. For example, the signals may be applied to separate windings on a common magnetic core (for example, transformer-based summing), or to opposite ends of a single winding using carefully arranged current paths and one or more taps connected to ground or another reference potential. The location of the tap may be strategically selected such that it determines the effective inductance seen by each driving signal. For example, on a winding with 100 turns, the tap may be positioned so that the audio signal sees 80 turns and the bias signal sees 20 turns, resulting in a greater inductance and magnetizing field contribution from the audio signal. The winding may include multiple taps, allowing the system to select different combinations dynamically or statically to achieve desired inductive relationships between signals. These inductive magnetic approaches allow the two signals to contribute to the net magnetizing field without requiring direct electrical summing. In another embodiment, the audio and bias signals may be summed using reactive elements in an active summing topology, where each signal is routed through a separate inductor or capacitor into a shared summing node that feeds the input of an amplifier. This configuration functions similarly to resistive summing, but introduces reactance that may be used for frequency shaping, signal isolation, or filtering. The method of summation is not limited to any specific topology, provided that the resulting composite signal excites the electromagnetic network in such a way that both signals contribute to the magnetizing H-field.

The voltage induced by the amplified electromagnetic network 201 is proportional to the time derivative of the magnetic flux (that is, dB/dt). This signal is then fed to an integrator 202, which performs a time-domain integration to reconstruct the magnetic flux signal. The integrator may be implemented using analog circuitry (for example, an operational amplifier integrator) or with discrete signal processing such as a discrete time filter in a digital system (for example, infinite impulse response, finite impulse response) or any digital numerical method to approximate an integral from a stream of numbers. In another embodiment, the integrator may be a passive low pass filter (for example, low pass filter comprising resistors, inductors, or capacitors), which may be beneficial in some applications where tape "hiss" (an intentionally raised noise floor) is created by passively attenuating the signal.

The output of the integrator is a magnetically distorted analog signal 203 that reflects the non-linear magnetization process within the magnetic structure. The resulting signal exhibits perceptual and spectral characteristics similar to those produced by magnetic recording media without requiring a moving magnetic medium or tape transport mechanism.

Figure 3:
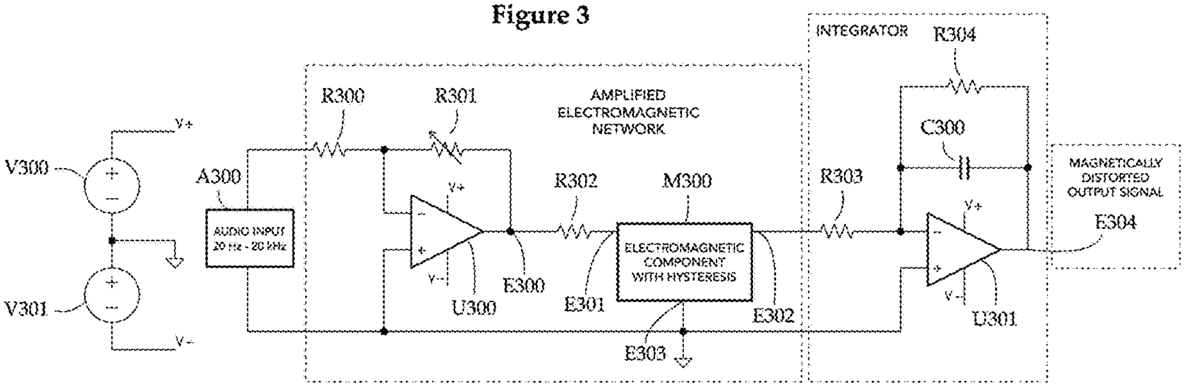
FIG. 3 is a circuit diagram of a concrete implementation of the invention.

In a second embodiment, the invention comprises a magnetic audio distortion device comprising an audio input signal, an amplified electromagnetic network with an electromagnetic component, and an integrator circuit connected to the output of the network, as shown in FIG. 3. The amplified electromagnetic network comprises an inverting amplifier, a series resistance, and an electromagnetic component. The integrator comprises an integrating amplifier.

In one embodiment an audio input signal comprising a voltage A300 is connected to an inverting amplifier comprising resistor R300, variable resistor R301, and operational amplifier (op-amp) U300. U300 is capable of: at least +16 volts of supply voltage on V+ and at most −16 volts on V−; supplying up to at least 200 mA output current; and operating with a slew rate sufficient for full-bandwidth audio signals. An example op-amp is the OPA551. The V+ pin of U300 is connected to a positive voltage source V300 which provides +16 Volts of DC power. The V− pin of U300 is connected to a negative voltage source V301 which provides −16 Volts of DC power.

This is one of many possible analog implementations, and other amplifier topologies, including discrete transistor circuits, vacuum tubes, or digital-to-analog driver stages, may be substituted without deviating from the invention.

In a preferred embodiment, the range of the voltage of the audio input signal is within the range of V+ and V−. In one embodiment, E300 is the voltage of the amplified audio signal. In the present embodiments and as understood in the relevant art, voltage measurements are referenced to ground unless otherwise specified.

The audio input signal can be sourced from a microphone, an electric musical instrument, a synthesizer, a sound generator, a signal generator, a transducer, a mixing console, a digital-to-analog-converter, or any device that can provide a fluctuating voltage signal in the range of approximately 20 Hz to 20 KHz.

The amplified audio signal E300 is connected to resistor R302. R302 is connected to an electromagnetic component that exhibits hysteresis M300. In another embodiment, M300 may be an inductor as shown in FIG. 4, wherein the inductor comprises connectors E400 and E401 and an inductor core comprising 410 and coil winding 420, with terminal E400 connected to nodes E301 and E302; and terminal E401 is connected to ground E303.

In one embodiment, as illustrated in FIG. 5, the inductor core (410 in FIG. 4) is having a toroidal shape 500. In one embodiment, the outer diameter of the toroid 510 may be approximately 4 mm. In another embodiment, the outer diameter may be 2.5 mm, 3 mm, 3.5 mm, 4 mm, 4.5 mm, or 5 mm, or any dimension therebetween. In another embodiment, the inner diameter 520 is approximately 2.4 mm. In another embodiment, the inner diameter may be 1.5 mm, 2.0 mm, 2.1 mm, 2.2 mm, 2.3 mm, 2.4 mm, 2.5 mm, 2.6 mm, 2.7 mm, or 2.8 mm, or any dimension therebetween. In yet another embodiment, the height 530 is 1.6 mm. In another embodiment, the height may be 1 mm, 1.3 mm, 1.4 mm, 1.5 mm, 1.6 mm, 1.7 mm, 1.8 mm, 1.9 mm, or 2 mm, or any dimension therebetween. In a preferred embodiment, the core material is a MnZn (manganese zinc) ferrite with an approximate initial permeability of 4300. In a preferred embodiment, the inductor core has one winding 540 which has 27 turns of 34 AWG (American Wire Gauge) polyurethane enameled copper magnetic wire. As illustrated in FIG. 4, E400 is the schematic depiction of the end of the winding 540 of FIG. 5. As also illustrated in FIG. 4, E401 is the schematic depiction of the other end of the winding 550 of FIG. 5. As further illustrated in FIG. 4, 420 is the schematic depiction of the winding from 540 to 550 of FIG. 5.

In another embodiment, the electromagnetic component M300 can be a transformer as shown in FIG. 6, where E600 is connected to E301; E601 is connected to E302; and E602 is connected to electrical connection E303. In one embodiment, the transformer core 610 is a toroidal shape 700 as shown in FIG. 7. In one preferred embodiment, the outer diameter of the toroid 710 is 4 mm. In another embodiment, the outer diameter may be 2.5 mm, 3 mm, 3.5 mm, 4 mm, 4.5 mm, or 5 mm, or any dimension therebetween. In another embodiment, the inner diameter 720 is approximately 2.4 mm. In another embodiment, the inner diameter may be 1.5 mm, 2.0 mm, 2.1 mm, 2.2 mm, 2.3 mm, 2.4 mm, 2.5 mm, 2.6 mm, 2.7 mm, or 2.8 mm, or any dimension therebetween. In yet another embodiment, the height 730 is 1.6 mm. In another embodiment, the height may be 1 mm, 1.3 mm, 1.4 mm, 1.5 mm, 1.6 mm, 1.7 mm, 1.8 mm, 1.9 mm, or 2 mm, or any dimension therebetween.

In a preferred embodiment, the core material is a MnZn (manganese zinc) ferrite with an approximate initial permeability of 4300. The core has two windings 740 and 760, each having 27 turns of 34 AWG polyurethane enameled copper magnetic wire. 620 is the winding from the end 740 to end 750. 630 is the winding from end 760 to 770. E600 is the schematic depiction of 740. E601 is the schematic depiction of 760. 750 and 770 are connected together and depicted as E602.

The toroid cores 500, 700 have an inductance factor of approximately 700 nH per turns-squared, giving approximately 510 μH for 27 turns.

R302 is in the range of 80Ω to 487Ω and its power rating must be specified for the minimum power dissipated, which can be calculated as V300 voltage-squared divided by R302. The resistance of R302 is between 1.25 times (at 80Ω) to 7.59 times (at 487Ω) the reactance of M300 at 20 kHz. E302 is the derivative of the magnetic flux for the transformer shown in FIG. 6 because the voltage induced in the secondary winding 630 is given by Faraday's Law of Induction. E302 is approximately the derivative of the magnetic flux for the inductor shown in FIG. 4. To restore the magnetic flux, E302 connected to an integrating amplifier comprising resistors R303 and R304, capacitor C300, and amplifier U301. R303 equals 2000Ω; R304 equals 10 MΩ; C300 equals 4.7 nF; and U301 is an op-amp capable of: +16 Volts on V+, −16 Volts on V−; has a slew rate greater than or equal to 2 V/μs; and can supply current required of the load it may be connected to in a larger system. An example op-amp is the NE5532. The output E304 is magnetically distorted from non-linear magnetic hysteresis in M300.

If the audio input signal is a standard line level +4 dBu signal having an amplitude of 1.74 volts, and if R301 is equal to 92.1 kΩ, the audio signal's amplitude is approximately 16 volts at E300. At 20 Hz, the electrical current through M300 is between 32.9 mA (when R302 equals 487Ω) and 200 mA (when R302 equals 80Ω). At 20 kHz, the electrical current through M300 is between 32.6 mA (when R302 equals 487Ω) and 156 mA (when R302 equals 80Ω). The electrical current creates a magnetic H-field in the winding(s) of M300. The strength of the H-field is calculated using the formula:

$$H = \frac{N}{l} i$$

H: Magnetic H-field (unit: Amperes per meter A/m)
N: Number of coil turns (unit: dimensionless)
i: Electrical current (unit: Amperes A)
l: Magnetic path length (unit: meter m)

For a 16 volt amplitude audio signal: at 20 Hz, the H-field is between 92.1 A/m (when R302 equals 487Ω) and 560.7 A/m (when R302 equals 80Ω); at 20 kHz the H-field is between 91.3 A/m (when R302 equals 487Ω) and 437.5 A/m (when R302 equals 80Ω), giving consistent magnetic field levels across the audio spectrum. The MnZn ferrite material begins to saturate around 90 A/m, so all audio frequencies are saturated when E300 is 15.8 volts for 487 2 or 3.3 volts for 80Ω.

The number turns on cores 500 and 700 can be increased or decreased to provide the desired level of non-linear hysteresis. Stronger H-field values provide more non-linear hysteresis because the signal traverses a wider range of the non-linear magnetization curve 101, 102. For example, increasing the number turns from 27 to 38 gives 1 mH of inductance. When R302 equals 487Ω, a 16 volt amplitude at E300 for 487 2 now creates a maximum H-field of 129.6 A/m at 20 Hz and 125.4 A/m at 20 kHz.

When the number of turns is reduced, a lower magnetic H-field and less non-linear hysteresis is achieved. For example, decreasing the number of turns from 27 to 13 gives 118 μH of inductance. When R302 equals 80Ω, a 16 volt amplitude at E300 now creates a maximum H-field of 270 A/m at 20 Hz and 265 A/m at 20 kHz, giving better frequency independent magnetic field strength in the audible spectrum than 27 turns, while still providing non-linear hysteresis including magnetic saturation.

Figure 8:
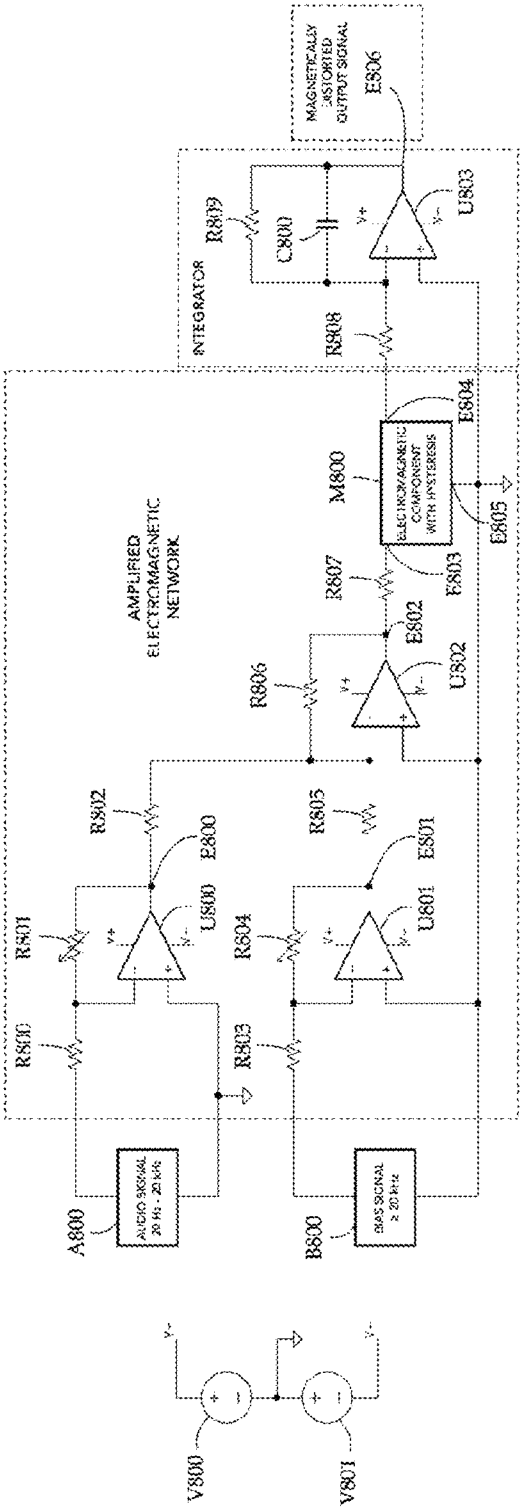
FIG. 8 is a circuit diagram of a concrete implementation of the invention including the optional bias signal superimposed on the audio signal.

In a third embodiment, the invention is a magnetic audio distortion device comprising an audio signal, an ultrasonic bias signal, two inverting amplifiers, a summing amplifier, an amplified electromagnetic network with an electromagnetic component, and an integrator circuit connected to the output of the network, as shown in FIG. 8.

An audio input signal A800 is connected to an inverting amplifier comprising R800, R801, and U800. R800 equals 10 kΩ; R801 is a variable resistor ranging from 0Ω to 100Ω; and U800 is an op-amp capable of: +16 Volts on V+, −16 Volts on V−; has a slew rate greater than or equal to 2 V/μs; and can supply electrical current required by load R802. E800 is the node of the amplified audio signal.

An ultrasonic input signal B800 with a frequency typically greater than or equal to 20 kHz is connected to an inverting amplifier comprising R803, R804, and U801. R803 equals 10 kΩ; R804 is a variable resistor ranging from 0Ω to 100 kΩ; and U801 is an op-amp capable of: +16 Volts on V+, −16 Volts on V−; has a slew rate specified for the frequency of the bias signal. (If, for example, the bias signal is a sine wave with a frequency of 100 kHz, the slew rate is greater than 10 V/μs, calculated by 2πfV); and can supply current required by load R802. E801 is the amplified bias signal.

The amplified audio signal E800 and amplified ultrasonic signal E801 are summed in the summing amplifier comprising R802, R805, R806, and U802. R802 equals 22 kΩ; R805 equals 4.7 kΩ; R806 equals 22 kΩ; U802 has the same capabilities as U300. The composite audio and bias signal E802 is connected to resistor R807. R807 is connected to an electromagnetic component that exhibits hysteresis M800.

M800 can be the toroidal inductor or toroidal transformer described and shown in FIG. 5 and FIG. 7, respectively. If an inductor is used as in FIG. 4 and FIG. 5, then E400 is connected to E803 and E804, and E401 is connected to E805. If a transformer is used as in FIG. 6 and FIG. 7, then E600 is connected to E803, E601 is connected to E804, and E602 is connected to E805.

R807 has the same range of resistances as R302. E804 is the derivative of the magnetic flux for the transformer shown in FIG. 7. E804 is approximately the derivative of the magnetic flux for the inductor shown in FIG. 5. To restore the magnetic flux, E804 is connected to an integrating amplifier comprising R808, R809, C800, and U803. R808 equals 2000Ω; R809 equals 10 MΩ; C800 equals 4.7 nF; and U803 has the same capabilities as U301. The output E806 is magnetically distorted from non-linear magnetic hysteresis or magnetic saturation in M800.

Because R807 is the same range as R302 and the M800 is the same as M300, the magnetic field calculations from above are the same. The second embodiment includes an ultrasonic signal B800 superimposed on an audio signal A800 which recreates the magnetic tape recording process with a soft magnetic material. The ultrasonic signal B800 is typically a sine wave in magnetic tape recording, but it can be any signal with frequency content above 20 kHz. For example, the bias signal could be any repeating or non-repeating waveform including, but not limited, to square wave, triangle wave, or sawtooth wave, or it could be a digitally generated signal with high-frequency content above 20 kHz, or it could be noise generated thermally, digitally, or electrically where audio range frequency content is removed via filtering mechanisms such as a high pass or band pass filter. If an analog sine wave is used as the bias signal, it can be produced through analog oscillator circuitry such as a Colpitts oscillator, Wien-Bridge oscillator, topologies noted in Sine-Wave Oscillator by Ron Mancini and Richard Palmer, Texas Instruments, or any circuitry capable of producing a sine wave. The bias sine wave could be produced digitally and converted to an analog signal using a digital-to-analog converter.

Figure 1:
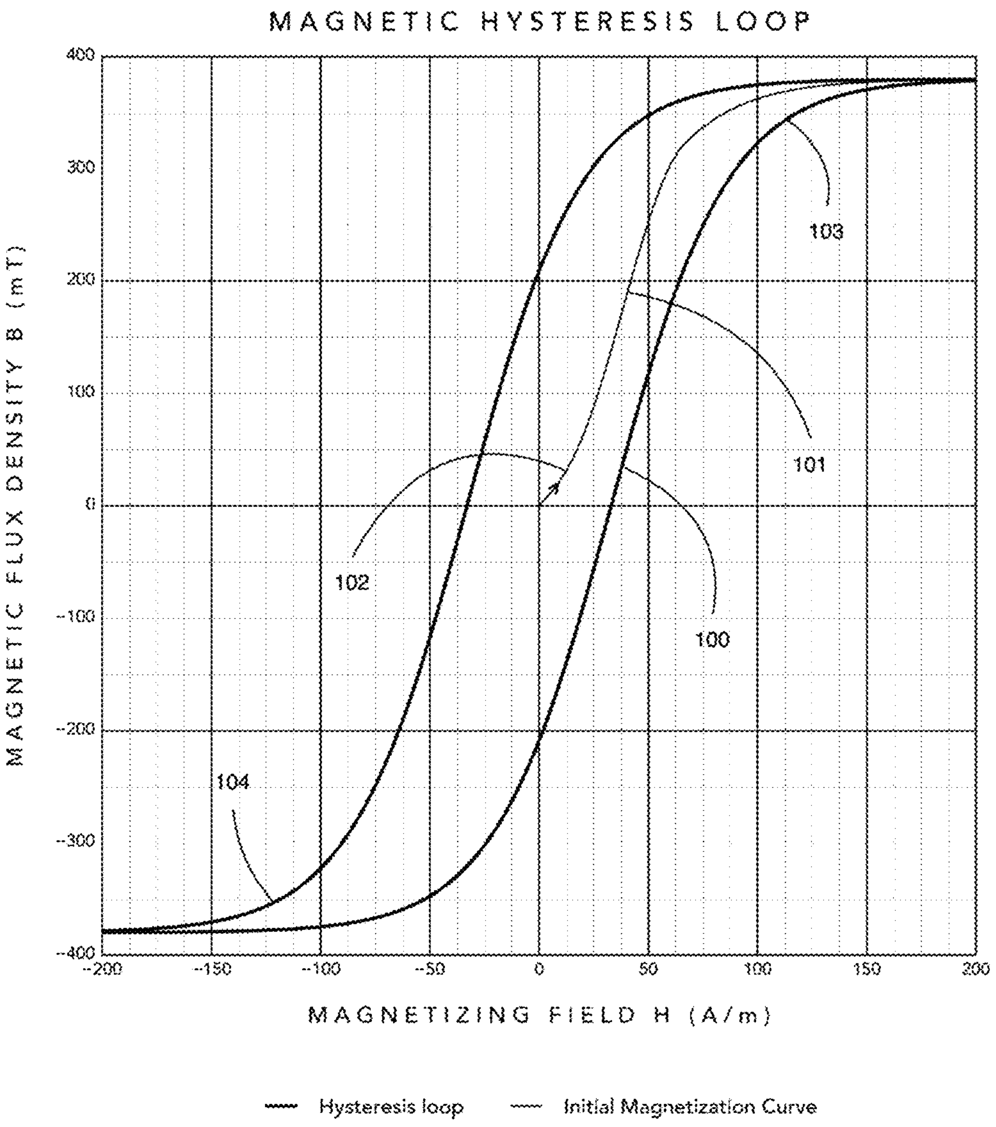
FIG. 1 is a plot of a major magnetic hysteresis loop, showing non-linear hysteresis.
Figure 9:
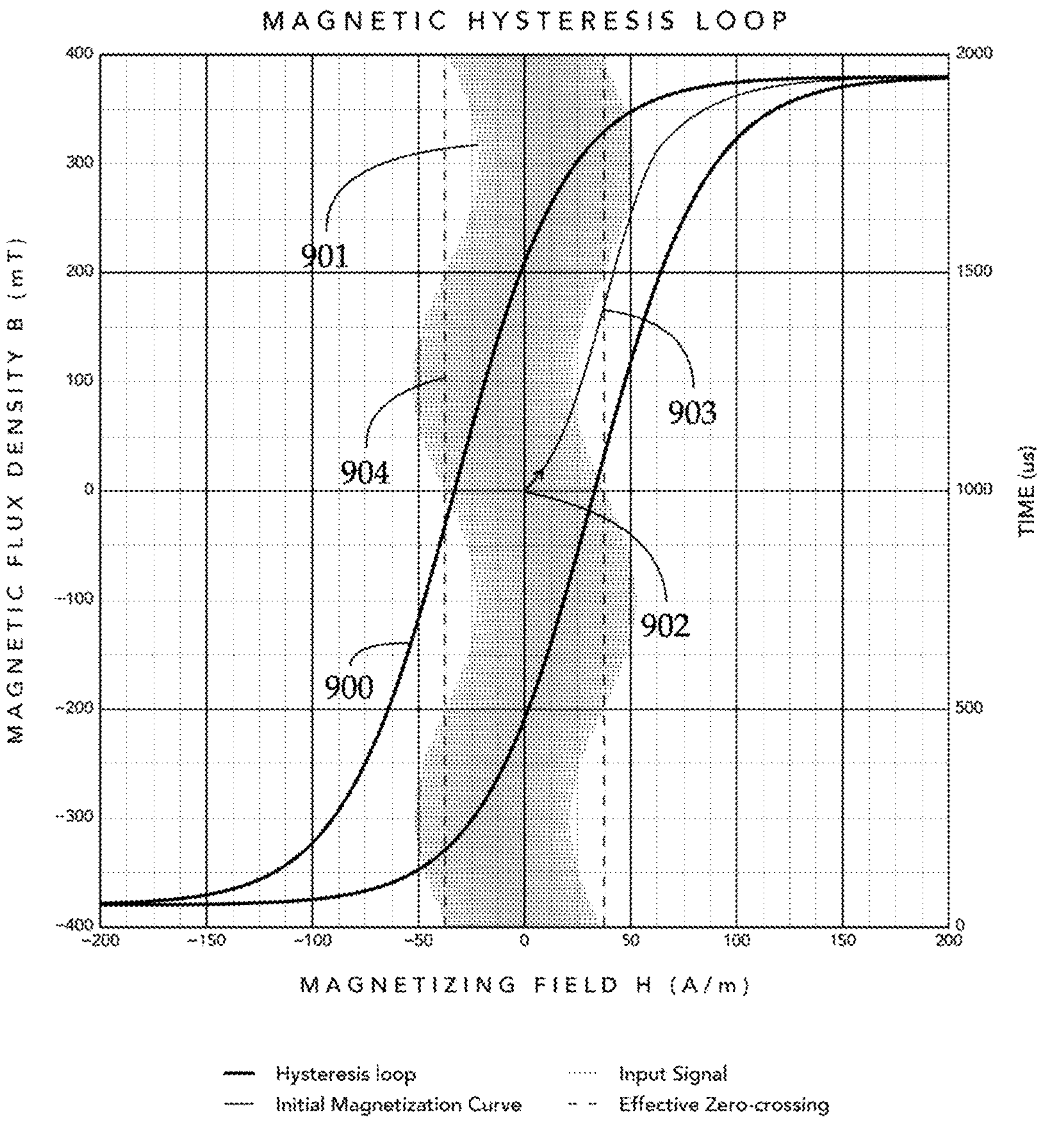
FIG. 9 is a plot of the major magnetic hysteresis loop with an AC biased signal overlaid.

The process of AC bias signal moves the zero-crossing of the audio source into a more linear region of the magnetization curve, thereby reducing distortion of the initial knee 102 (FIG. 1). In FIG. 9, a magnetic hysteresis loop similar to FIG. 1 is shown. 900 is the major hysteresis loop (100 in FIG. 1). An example 100 kHz bias signal superimposed on a 1 kHz signal is shown as 901. The zero-crossing of a 1 kHz signal without bias is positioned at 902. The non-linearity of the initial knee will create significant distortion on 1 kHz signal. The dashed lines show the effective zero-crossing 903 for positive H-field and 904 for negative H-field. It can be seen that effective zero crossing is positioned on a more linear portion of the hysteresis curve, which greatly reduces the distortion of the signal.

Figure 10:
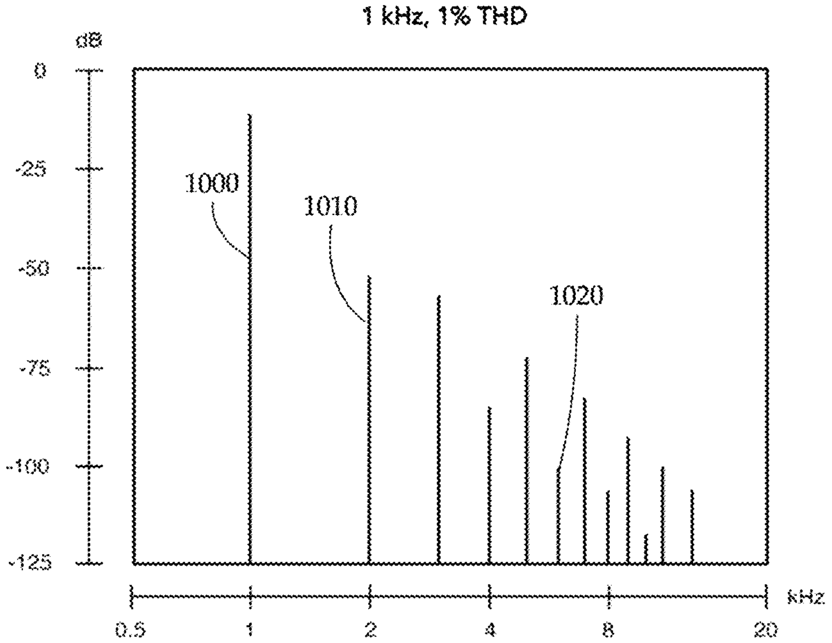
FIG. 10 is a plot of the 1 kHz 1% Total Harmonic Distortion (THD) of the first embodiment.
Figure 11:
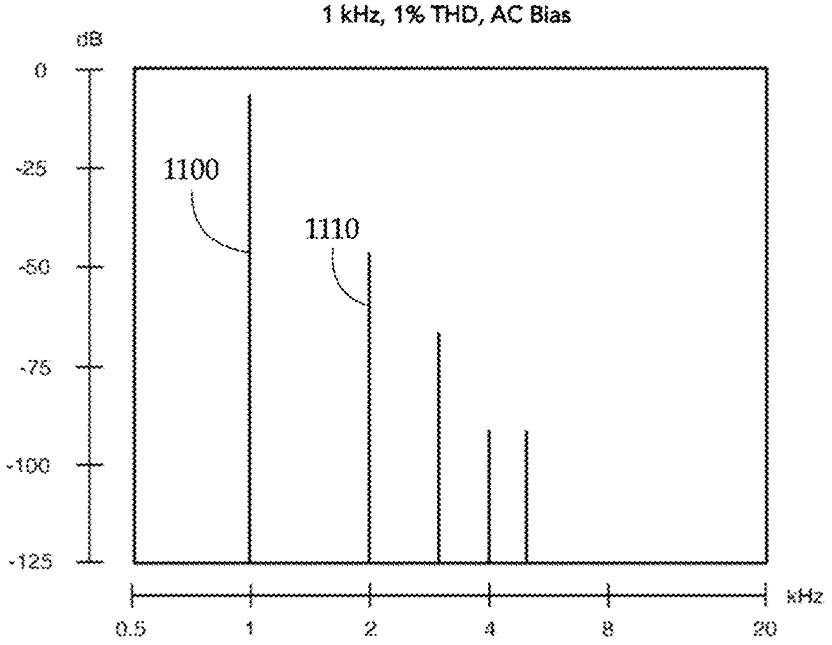
FIG. 11 is a plot of the 1 kHz 1% Total Harmonic Distortion (THD) of the second embodiment when AC bias is used.

The distortion reducing effect of AC Bias can be shown through a Total Harmonic Distortion (THD) plot as shown in FIG. 10 and FIG. 11. In this test, the level of a 1 kHz audio signal A800 is set through R801 such that the THD equals 1%. The ultrasonic signal B800 in the test is a 100 kHz sine wave. For this test: the resistance of R807 is 330Ω; M800 is a Murata 78615 pulse transformer with approximately 500 μH on the primary winding; U802 is a discrete op-amp built from discrete transistors. FIG. 10 shows 1% THD for a 1 kHz signal in the case where no AC bias is used and the signal is centered at H=0 on the hysteresis curve, where non-linearity is greatest 902 (FIG. 9). 1000 is the fundamental 1 kHz frequency; 1010 is the second harmonic at 2 kHz. There are harmonics at each integer multiple of 1 kHz, extending to the 12th harmonic at 12 kHz. When the bias signal has a 5 volts amplitude at E802, the 1% THD plot changes significantly as shown in FIG. 11. 1100 is the fundamental 1 kHz frequency; 1110 is the second harmonic at 2 kHz. Odd harmonics greater than or equal to 3 kHz are reduced, and all harmonics greater than or equal to 6 kHz 1020 are undetectable by the test equipment. Additionally, the 1 kHz fundamental frequency level of 1100 has increased by several dB compared with 1000.

The above test uses a 100 kHz bias signal because it is an ideal frequency supported by the inductance and resistance values in the example circuit, but any bias frequency greater than or equal to 20 kHz may provide similar distortion-reducing effects.

We have thus demonstrated that applying AC bias to a soft magnetic core reduces higher order distortion, which is what occurs with hard magnetic materials used in magnetic audio tape recording. Applying the process of AC Bias to soft magnetic cores shows a remarkably similar result as seen in magnetic audio tape recording. More information on AC bias in magnetic audio tape recording is available in *Biasing in Magnetic Tape Recording*, Mcknight. By varying the level of audio signal A200 or bias signal B200, the intensity and shape of magnetic distortion is made controllable across the across spectrum, providing a useful sonic shaping tool for use in audio recording.

Amplified Electromagnetic Network Design Methodology

The embodiments above use a toroid core made from an MnZn ferrite material to demonstrate the invention with simplicity, but the electromagnetic component of the invention is not limited to a specific magnetic material or core shape. This is demonstrated by providing a step-by-step process to design an amplified electromagnetic network for the invention, whereby any magnetic material and any magnetic core shape which may be derived with the step-by-step process is suitable.

The constraints of the present invention are:

1. Consistent magnetic field strength H across the frequency range of interest.
2. Magnetic field strength H capable of creating the desired level of non-linear hysteresis.

Constraint 1

The formula for inductive reactance $X_L$ is given by Equation 1.

$$X_L=2\pi fL \quad \text{Equation 1}$$

$X_L$: Inductive Reactance (unit: ohm Ω)

f: Frequency (unit: Hertz Hz)

L: Inductance (unit: Henry H)

The formula for impedance Z is given by Equation 2.

$$Z=\sqrt{R^2+X_L^2} \quad \text{Equation 2}$$

Z: Impedance (unit: ohm Ω)

R: Resistance (unit: ohm Ω)

Frequencies $f_\alpha$: Maximum frequency of audio signal (unit: Hertz Hz)

$f_b$: Maximum frequency of ultrasonic bias signal (unit: Hertz Hz)

$f_c$: −3 dB corner frequency (unit: Hertz Hz)

Let $f_\alpha$ be the maximum audio signal frequency, and let $f_b$ be the highest frequency component of interest in an optional ultrasonic bias signal. Define $f_{max}$ as the highest frequency of interest in the signal applied to the electromagnetic network. If an ultrasonic bias signal is present, then $f_{max}=f_b$; otherwise, $f_{max}=f_\alpha$.

Constraint 1 is satisfied when the corner frequency $f_c$ of the electromagnetic network's low-pass filter (set by the series resistance R and the inductance L of the magnetic winding) is greater than or equal to $f_{max}$. This ensures that the magnetizing field H remains substantially flat across the frequency range of interest.

In some embodiments, $f_c$ may be less than $f_{max}$ if the input signal is pre-emphasized to compensate for the attenuation introduced by the reactive low-pass behavior of the magnetic component. This allows the H-field to remain effectively flat after pre-emphasis and subsequent roll-off through the electromagnetic network.

Constraint 2

To meet Constraint 2, an electromagnetic component must be specified for the desired amount of non-linear magnetic hysteresis. The amplified electromagnetic network is specified according to the following parameters:

The maximum voltage of the circuitry $V_{max}$

The maximum current supplied by the circuitry $i_{max}$

The series resistance R

The magnetic core cross-sectional area A

The magnetic path length l.

The number of coil turns N

The magnetic material's initial permeability $u_i$

The magnetic material's saturation magnetic field $H_s$

The inductance of the electromagnetic component L

A step-by-step process to specify the parameters is provided.

Formulas

The formula for the inductance L of a winding on a magnetic core is given by Equation 3.

Equation 3:

$$L = \frac{N^2 u_0 u_i A}{l}$$

L: Inductance (unit: Henry H)

N: Number of coil turns (unit: dimensionless)

$u_0$: Vacuum permeability given by: $u_0 = 4\pi 10^{-7}$ (unit: Henry per meter H/m)

$u_i$: Initial permeability of the magnetic material of the core, relative to the vacuum permeability $u_0$ (unit: dimensionless)

A: Area of the magnetic core (unit: meters squared $m^2$)

l: Magnetic path length (unit: meter m)

Substitute L from Equation 3 into Equation 1 to yield Equation 4.

Equation 4:

$$X_L = 2\pi f \frac{N^2 u_0 u_i A}{l}$$

The formula for the magnetic H field is given by Equation 5:

Equation 5:

$$H = \frac{N}{l} i$$

H: Magnetic H-field (unit: Amperes per meter A/m)

i: Electrical current (unit: Amperes A)

The formula for electrical current i is given by Equation 6:

Equation 6:

$$i = \frac{V}{Z}$$

V: Voltage (unit: Volts V)

Step-by-step Procedure

Step 1

Let $V_{max}$ represent the maximum voltage output of the amplifier, and $i_{max}$ the maximum output current. These values define the power available to drive the reactive electromagnetic network. Begin by measuring or referencing the amplifier's open-circuit output swing ($V_{max}$) as specified in the datasheet or by empirical testing. Then, connect a known resistive load $R_L$ to the amplifier output and measure the maximum output voltage under load. The maximum current $i_{max}$ can then be estimated using Equation 7.

Equation 7:

$$i_{max} = \frac{V_{max}}{R_L}$$

Many operational amplifier datasheets provide these values directly, making direct measurement optional. At this point, the maximum voltage $V_{max}$ for a maximum current $i_{max}$ has been determined.

Step 2

To avoid exceeding the amplifier's current capacity, the resistance in the electromagnetic network must be selected such that the maximum expected current does not exceed $i_{max}$. At low frequencies (including DC), the inductive reactance $X_L$ of the magnetic component is negligible ($X_L \approx 0$), and the series resistance R dominates the load impedance.

Therefore, the minimum resistance $R_{min}$ required to keep current within safe operating limits is calculated with Equation 8.

Equation 8:

$$R_{min} = \frac{V_{max}}{i_{max}}$$

This ensures that the amplifier can safely drive the electromagnetic network without current clipping or thermal overload. At this point, the minimum resistance $R_{min}$ has been determined.

Step 3

Substitute the expression for current i from Equation 6 into the magnetizing field expression from Equation 5, using the maximum voltage $V_{max}$, to yield Equation 9.

Equation 9:

$$H = \frac{N V_{max}}{l\, Z}$$

To determine only the inductive contribution to the magnetizing field, assume a purely inductive impedance by setting resistance R=0. Substituting $Z = X_L = 2\pi f_c L$ from Equation 4 into Equation 9 yields Equation 10.

Equation 10:

$$H_L = \frac{V_{max}}{2\pi f_c N u_0 u_i A}$$

Equation 10 shows that the magnetic field strength $H_L$ is inversely proportional to the core's cross-sectional area A. A smaller core area increases the magnetizing field, which promotes stronger non-linearity and greater excursion across the magnetic hysteresis curve—as shown in region 903 of FIG. 9. To maximize non-linear distortion effects, select a core with the smallest possible area A. Once the area is selected, the associated magnetic path length l can be found from the geometry or datasheet of the chosen core. At this point, values for both A and l have been determined.

Step 4

Determine the magnetic wire diameter $w_d$ (including insulation material). Lower values of $w_d$ have lower electrical current capability. The maximum current capability of the circuitry is $i_{max}$. Choose the minimum wire diameter capable of $i_{max}$. The maximum current capability of the magnetic wire can be determined by datasheets, IPC standards, or experimentally by gradually increasing current through the wire until thermal failure occurs (for example, melting insulation). The area of the magnetic wire is calculated by Equation 11.

Equation 11:

$$w_a = \pi\left(\frac{w_d}{2}\right)^2$$

Determine the maximum number of turns $N_{max}$ that can physically fit within the available winding window area (which is separate from the magnetic cross-sectional area A used in inductance calculations). This can be determined numerically, depending on the winding area and core shape. For example, in a toroid core, it can be solved as smaller circles within a larger circle. For a rectangular winding area the area of the wire can be approximated as a square. Numerical methods only provide a theoretical maximum. To account for winding error, $N_{max}$ can be verified or determined by winding the core until no more turns are possible, making sure to count the total number of turns.

The maximum number of turns $N_{max}$ applies to all windings on the core. If more than one winding is used on the core (for example, a transformer), the sum of the number of turns across all windings will not exceed $N_{max}$. At this point, $N_{max}$ is solved.

Step 5

To satisfy Constraint 1, the magnetic material must support an inductance that ensures the corner frequency $f_c$ of the electromagnetic network is greater than or equal to the maximum frequency of interest $f_{max}$. When the signal frequency f equals the corner frequency $f_c$, the inductive reactance $X_L$ equals the series resistance R. Set $X_L$=R in Equation 4. Then, substitute R=$R_{min}$ and N=$N_{max}$, and rearrange the equation to solve for the minimum required initial permeability $u_{min}$. This yields Equation 12.

Equation 12:

$$u_{min} = \frac{Rl}{2\pi f_c N^2 A u_0}$$

The value of $u_{min}$ is the minimum required initial permeability for the selected number of turns $N_{max}$, series resistance $R_{min}$, and magnetic core cross-sectional area A. In practice, available magnetic materials may have initial permeabilities greater than $u_{min}$. If the selected material's initial permeability $u_i$ exceeds $u_{min}$, the inductance per turn increases, which lowers $f_c$. If $f_c$ drops below $f_{max}$, Constraint 1 is no longer satisfied (when no pre-emphasis is used). To restore compliance, either R or N can be adjusted.

Option 1: Increase R above $R_{min}$ to restore $f_c \geq f_{max}$. Increasing R reduces the current i drawn by the amplifier, which is permitted because $R_{min}$ was calculated in Step 2 for maximum current.

Option 2: Reduce N below $N_{max}$ to raise $f_c$. This is permissible because $N_{max}$ was the upper bound for physical winding capacity.

Revised values of R and N to accommodate a given $u_i$ can be calculated as follows:

Equation 13:

Equation 14:

$$R = \frac{2\pi f_c N^2 A u_0 u_i}{l}$$

-continued $$N = \sqrt{\frac{Rl}{2\pi f_c A u_0 u_i}}$$

At the end of this step, compatible values of initial permeability $u_i$, resistance R, and number of turns N have been selected.

Step 6

Calculate the revised maximum current $i_{max}$ for the value of R selected in Step 5 by substituting Z=R in Equation 6. Use Equation 5 to calculate the maximum magnetizing field strength $H_{max}$. for the revised maximum current $i_{max}$.

$$H_{max} = \frac{N}{\iota} i_{max}$$

This is the peak magnetic field that will be generated in the core under full output conditions.

Step 7

In free space, the magnetic B-field B is related to the magnetic H-field H by Equation 15.

$$B = u_0 H \qquad \text{Equation 15}$$

B: Magnetic flux density of magnetic core (unit: Tesla T)

In a magnetic material, the relationship between the magnetic flux B and magnetizing field H is described by a BH curve showing the magnetic hysteresis 100 (FIG. 1). As H approaches infinity, B approaches a finite maximum value. B does not approach infinity, because there are a finite number of magnetic domains in the material, and eventually they all become aligned and "used up". The point where an increase in H results in a negligible increase in B is when the material is considered saturated 103, 104. For values of H below saturation, Equation 15 can be expanded to include the initial permeability of the material, giving the approximate magnetic flux density B'in Equation 16.

$$B' \approx u_0 u_i H \qquad \text{Equation 16}$$

This approximation assumes that the initial permeability $u_i$ is a reasonable estimate of the material's effective permeability over the range of H. However, this may not hold for high-coercivity, low-permeability ferrites such as NiZn types. In these materials, the incremental permeability may increase with H, particularly near the coercive field, potentially causing Equation 16 to overestimate B at low fields or underestimate it at higher fields.

For example, Fair-Rite's 67 material, which has an initial permeability of 40, shows a substantial increase in incremental permeability as H rises, according to the manufacturer's datasheet. Designers should consult such charts where available, or directly measure the B-H curve, to ensure accurate modeling of saturation behavior in materials with non-constant permeability before saturation.

If the initial permeability is approximately equal to the material's effective permeability over the range of H, the approximation given by Equation 16 is typically valid. As H increases, however, the approximation becomes inaccurate as the material becomes saturated. This inaccuracy can be described mathematically as a reduction in the effective slope $u_0u_i$, or physically as a decrease in the material's permeability. In Equation 17, the observed point of saturation $B_s$ is modeled as the approximate flux density B' divided by a saturation coefficient $c_s$, where $c_s \geq 1.5$ indicates the onset of saturation.

Equation 17:

$$B_s = \frac{B'}{c_s}$$

$c_s$: Saturation coefficient (unit: dimensionless)

When $c_s \geq 1.5$, the material may be considered to be in the saturation region. Other thresholds may be used depending on desired distortion characteristics. The magnetic field level H where $c_s = 1.5$ is the saturated magnetic field $H_s$. Values of H greater than $H_s$ are in the saturation region. Magnetic saturation is of particular interest in the present invention, as it enables full traversal of the non-linear hysteresis curve. Depending on the desired audio characteristics, the designer may desire a magnetic field strength below, near, or above the material's saturation threshold. It is up to the designer of the audio device to choose how much non-linear hysteresis is appropriate. For example, some mechanical magnetic recording systems are capable of saturating the magnetic medium while others cannot. To achieve a modern high-fidelity magnetically distorted sound, subtle non-linear hysteresis without overt magnetic saturation may be desired. For a creative and intentionally low-fidelity sound, magnetic saturation may be desired to achieve a highly distorted sound.

To determine $H_s$, choose a core material having an initial permeability approximately equal to $u_i$. Manufacturers of magnetic core materials typically provide the material's BH curve. From the BH curve, inspect if the maximum magnetic field $H_{max}$ is in the saturation region, $H_{max} \geq H_s$. If so, the magnetic component will create non-linear hysteresis up to and including magnetic saturation, spanning the full range of non-linear hysteresis. If less non-linear hysteresis is desired, the number of turns on the winding can be reduced or the resistance can be increased, which will move the corner frequency $f_c$ to a greater value, retaining the consistent magnetic field level across the audible spectrum. If a BH curve is unavailable, it can be measured using the process described in "Measuring the Magnetic Hysteresis" by Freddy Alferink (2013).

At the end of this step, the saturation field value $H_s$, for the magnetic material has been determined.

Step 8

Using Equation 3 and values from the previous steps, we calculate the inductance L of the winding of the electromagnetic component. The value L can be used to verify the corner frequency $f_c$ with Equation 18.

Equation 18:

$$f_c = \frac{R}{2\pi L}$$

At the end of this step, the inductance L has been determined.

SUMMARY

The amplified electromagnetic network, as designed in the foregoing steps, satisfies Constraint 1 by producing a substantially frequency-independent magnetizing H-field across the desired audio bandwidth. It also satisfies Constraint 2 by generating a magnetic H-field strength sufficient to induce non-linear hysteresis behavior in the magnetic material, including magnetic saturation where desired.

EXAMPLES

The invention will be more readily understood by reference to the following examples, which are included merely for purposes of illustration of certain aspects and embodiments of the present invention and not as limitations.

Amplified Electromagnetic Network Design Methodology

Example I

The maximum frequency of interest in this example is in a bias signal where $f_b = f_{max} = 200$ kHz. Thus, $f_c \geq 200$ kHz.

Step 1

If the amplifier is capable of supplying 200 mA of current with a supply voltage of +16 volts on the V+pin and −16 volts on the V-pin, $i_{max} = 200$ mA, $V_{max} = 16$ volts. An example of such an amplifier is the OPA551.

Step 2

$$R_{min} = 80\Omega.$$

Step 3

A feasible core choice is the B64290P0035 toroid core from TDK: A=0.49 mm$^2$; l=6 mm.

Step 4

A feasible magnetic wire size is 32 AWG (American Wire Gauge), $w_d = 0.224$ mm. For toroid B64290P0035 with 32 AWG wire, $N_{max}$ is theoretically determined to be approximately 32 turns by solving how many smaller circles of diameter 0.224 mm fit in a larger circle of diameter 1.5 mm (the inner diameter of B64290P0035). To account for winding error, we reduce $N_{max}$ to a practical 25 turns.

Step 5

The minimum initial permeability is calculated as $u_{min} = 993$. The lowest permeability material for the B64290P0036 core is TDK's MnZn N30 ferrite material with an initial permeability in the range of [3225, 5375], given by 4300 with a +/−25% tolerance. N30 is a feasible choice when the number of turns N is reduced from 25 to a value in range [11, 14], which is beneficial as it permits the core to be wound as either a transformer or inductor. We choose a median value in the range, N=12. R can be set as the minimum resistance $R_{min}$ of 80Ω determined in Step 2.

We've solved for the following parameters: $u_i \approx 4300$, N=12, R=80Ω.

Step 6

$$H_{max} = 399\ A/m.$$

Step 7

By inspecting the provided BH curve in the N30 ferrite material data sheet, we see that $H_s \approx 90$ A/m. This is lower than $H_{max}$, so the magnetic H field is strong enough to saturate the core material, providing the full range of non-linear hysteresis, if desired.

Step 8

We solve for the inductance using the parameters calculated above, L=63.5 μH. With Equation 18, we calculate $f_c = 200$ KHz.

Example II

The maximum frequency of interest in this example is in a bias signal where $f_b = f_{max} = 80$ KHz. Thus, $f_c \geq 80$ kHz.

Step 1

If the amplifier is capable of supplying 200 mA of current with a supply voltage of +16 volts on the V+pin and −16 volts on the V-pin, $i_{max} = 200$ mA, $V_{max} = 16$ volts. An example of such an amplifier is the OPA551.

Step 2

$R_{min}=80\Omega$.

Step 3

A feasible core choice is the B64290P0037 toroid core from TDK: A=3.06 $mm^2$; l=15.21 mm.

Step 4

A feasible wire choice is 30 AWG (American Wire Gauge) from Remington Industries. For toroid B64290P0037 with 30 AWG wire, $N_{max}$ is theoretically determined to be approximately 143 turns by solving how many smaller circles of diameter 0.277 mm fit in a larger circle of diameter 3.8 mm (the inner diameter of B64290P0037). To account for winding error, we reduce $N_{max}$ to a practical 100 turns.

Step 5

The minimum initial permeability is $u_{min}$=62.95. The B64290P0037 core material is chosen as TDK's MnZn N30 ferrite material with an initial permeability in the range of [3225, 5375], given by 4300 with a +/−25% tolerance. N30 is a feasible choice when the number of turns N is reduced to a value in the range [11, 14]. This is calculated by rearranging Equation 13 to solve for N as shown in Equation 14.

Equation 13:

$$N = \sqrt{\frac{Rl}{2\pi f_c A u_0 u_i}}$$

We've solved for the following parameters: $u_i\approx4300$, N=12, R=80Ω.

Step 6

$H_{max}=157.8\ A/m$.

Step 7

By inspecting the provided BH curve in the N30 ferrite material data sheet, we see that $H_s\approx90$ A/m. This is lower than $H_{max}$, so the magnetic H field is strong enough to saturate the core material, providing the full range of non-linear hysteresis, if desired.

Step 8

We solve for the inductance using the parameters calculated above, L=157 μH. With Equation 18, we calculate $f_c$=81.3 kHz.

Example III

The maximum frequency of interest in this example is in a bias signal where $f_b=f_{max}$=200 KHz. Thus, $f_c\geq200$ KHz.

Step 1

If the amplifier is capable of supplying 200 mA of current with a supply voltage of +16 volts on the V+pin and −16 volts on the V-pin, $i_{max}$=200 mA, $V_{max}$=16 volts. An example of such an amplifier is the OPA551.

Step 2

$R_{min}=80\Omega$.

Step 3

Figure 12:
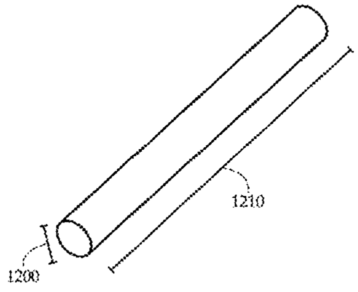
FIG. 12 is a diagram of a rod magnetic core.

We choose a rod (cylindrical) core as shown in FIG. 12 with 1 mm diameter 1200 and 10 mm length 1210. We have solved for the effective core cross-sectional area A=0.785 $mm^2$ and magnetic path length l≈10 mm.

Step 4

Figure 13:
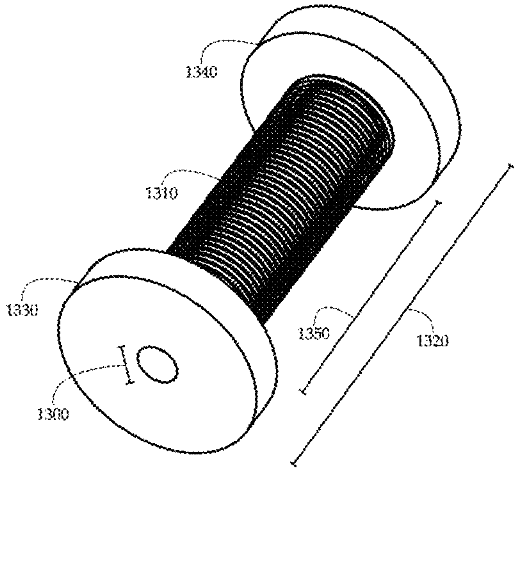
FIG. 13 is a diagram of a wound bobbin for a rod magnetic core.

34 AWG wire, with $w_d$=0.178 mm. A bobbin shown in FIG. 13 has an opening 1300 of 1 mm diameter to hold the rod core. The shaft to hold the windings 1310 has a diameter of 2 mm. The bobbin has a total length of 10 mm 1320. The outside edges of the bobbin 1320 1330 have a diameter of 5 mm and a width of 1 mm, giving 8 mm of winding space length 1350. The winding space of the bobbin is approximately 8 mm×1.5 mm, yielding $A_N$=12 $mm^2$, $N_{max}$=482. To account for winding error, we'll reduce this to $N_{max}$=400.

Step 5

The minimum initial permeability is 4. We choose the Fair Rite 3061990831 ferrite core made from the 61 NiZn material, which has an initial permeability of 125. The rod core is open ended which increases reluctance of the magnetic path, giving an approximate effective permeability of 35. We reduce the number of turns to 136.

We've solved for the following parameters: $u_i\approx35$, N=136, R=80Ω.

Step 6

$H_{max}=2720\ A/m$.

Step 7

From the datasheet for the 61 ferrite material, we see $H_s\approx280$ A/m. The datasheet is for a closed magnetic path with initial permeability of 125. Since lower effective permeability implies greater reluctance and a higher required H-field to achieve the same flux density, the saturation field is scaled proportionally. The effective permeability of the rod is 35, so we can approximate $H_s$ for the rod as 125 divided by 35 times the closed path $H_s$. Thus $H_s\approx1000$ A/m. This is lower than $H_{max}$, so the magnetic H field is strong enough to saturate the core material, providing the full range of non-linear hysteresis, if desired.

Step 8

We solve for the inductance using the parameters calculated above, L=63.86 μH. With Equation 18, we calculate $f_c$=199 kHz, which is approximately equal to 200 kHz.

Example IV

The invention described above may be further understood in terms of the following tiered architectural disclosures, which summarize and clarify the relationship between system components and signal behavior.

Tier 1

The reactance and resistance of the amplified electromagnetic network determine the corner frequency of the low pass filter on the current and thus the magnetic H-field. The output of the amplified electromagnetic network is the derivative of the input signal, because the voltage induced in the secondary of the transformer is the derivative of the magnetic flux in the core, given by Faraday's Law of Induction. In the case of a real inductor, the output is approximately the derivative, where lower DCR (direct current resistance) values of the inductor's coil provide a more accurate approximation of the derivative.

In amplified electromagnetic networks using typical audio transformers in audio devices, the corner frequency is made to be as low as possible by using large transformers with high inductances. Typically, the corner frequency is below the lowest audio frequency (20 Hz) to yield a flat frequency response for the lowest audio frequencies. The present invention inverts this. The corner frequency is above the highest audio frequency of 20 kHz. This would normally be considered a flawed transformer design, but a transformer must be designed as such to achieve consistent levels of magnetic flux across the audio spectrum. This novel method of transformer design also aligns with the process of magnetic tape recording, where the reproduce head provides the derivative of the flux in the magnetic tape, given by Faraday's Law of Induction. The output of the integrator yields a flat frequency response of the flux in the core, because integration is the inverse of differentiation. Audio magnetic tape recorders also have an integrator circuit connected to the reproduce head to restore the flux in the magnetic tape.

The system generally comprises:

(a) an audio input signal is connected to an amplified electromagnetic network containing at least one electromagnetic component exhibiting non-linear hysteresis. The amplified electromagnetic network produces a frequency-independent magnetizing field that induces non-linear hysteresis across the audio spectrum.

(b) the output of the amplified electromagnetic network is the derivative of the audio input signal, and this output is connected to an integrator circuit, yielding a flat frequency response across the audio spectrum and an output signal that has been distorted by non-linear hysteresis of the electromagnetic component.

Tier 2

Comprises all of Tier 1, but includes an ultrasonic bias signal connected to the amplified electromagnetic network, where it is superimposed on the audio signal. The ultrasonic bias signal has a frequency greater than or equal to 20 KHz.

From the foregoing description, it should be apparent that a magnetic audio distortion device is provided where an amplified electromagnetic network creates consistent levels of magnetic flux and non-linear hysteresis across the audio spectrum in an electromagnetic component. An ultrasonic bias signal is superimposed on an audio signal to create the AC bias process which occurs in magnetic audio tape recording. The embodiments herein provide a means for producing consistent magnetic distortion across the audio spectrum without requiring mechanical apparatus or hard magnetic material.

Those skilled in the art will appreciate that various adaptations and modifications of the just-described embodiments can be configured without departing from the scope and spirit of the invention. Other suitable techniques and methods known in the art can be applied in numerous specific modalities by one skilled in the art and in light of the description of the present invention described herein. Therefore, it is to be understood that the invention can be practiced other than as specifically described herein. The above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

I claim:

1. A magnetic audio distortion system comprising:

an input configured to receive an audio signal;

an amplified electromagnetic network comprising at least one amplifier, a series resistance, and at least one electromagnetic component exhibiting non-linear magnetic hysteresis, the network configured to generate a substantially frequency-independent magnetizing field across the audio frequency spectrum up to at least 20 kHz; and an integrator electrically coupled to the output of the amplified electromagnetic network, the integrator configured to reconstruct a voltage corresponding to magnetic flux in the electromagnetic component, thereby producing a magnetically distorted output signal.

2. The system of claim 1, further comprising an ultrasonic bias signal source configured to inject a bias signal into the amplified electromagnetic network, wherein the bias signal is at least 20 kHz and configured to shift the operating point along the magnetic hysteresis curve.

3. The system of claim 2, wherein the frequency range of the bias signal is between 20 kHz and 200 kHz.

4. The system of claim 2, wherein the bias signal is combined with the audio signal through one or more of: passive summing, active circuitry, digital domain summing, and inductive coupling.

5. The system of claim 1, wherein at least one electromagnetic component comprises a magnetic core with a relative initial permeability of at least 4.

6. The system of claim 1, wherein at least one electromagnetic component comprises a magnetic core with an effective cross-sectional area of at least 0.49 $mm^2$.

7. The system of claim 1, wherein at least one electromagnetic component comprises a magnetic core with a magnetic path length of at least 6 mm.

8. The system of claim 1, wherein the amplified electromagnetic network is configured to drive the core to magnetic saturation during normal operation.

9. The system of claim 1, wherein the series resistance of the amplified electromagnetic network is greater than or equal to the inductive reactance of the electromagnetic component at 20 KHz.

10. The system of claim 1, wherein at least one amplifier comprises one or more of: an integrated circuit operational amplifier, discrete transistors, vacuum tubes, and a digital-to-analog converter.

11. The system of claim 1, wherein the integrator comprises one or more of: active analog circuitry, passive circuitry, and digital signal processing.

12. The system of claim 1, wherein the amplified electromagnetic network further comprises a pre-emphasis filter configured to maintain consistent levels of magnetic flux in the electromagnetic component across the audio spectrum.

13. A method for processing an audio signal input to create consistent levels of magnetic flux and non-linear hysteresis across the audio frequency spectrum, and wherein an output signal is a magnetically distorted audio output signal, the method comprising:

a. providing the magnetic audio distortion system of claim 1;

b. inputting a first audio signal, the first audio signal comprising an audio signal frequency of between 20 Hz and 20 kHz;

c. applying the first audio signal to an amplified electromagnetic network wherein the amplified electromagnetic network comprises one or more electromagnetic components, the electromagnetic components comprising a core material, the core material exhibiting non-linear hysteresis, and wherein the amplified electromagnetic network produces a second signal that reflects the non-linear magnetic behavior of the core material in response to the input first audio signal, and wherein the voltage of the second signal is proportional to the time derivative of magnetic flux of the core material;

d. passing the second signal to an integrator, wherein the integrator senses the voltage of the second signal; and e. performing a time-domain integration of the sensed voltage, wherein the integration recovers a flux produced within the core material, thereby producing a magnetically distorted audio output signal.

14. The method of claim 13, further comprising recreating a process of AC-bias used to reduce distortion in magnetic tape audio recording, the method comprising:

f. inputting an ultrasonic signal for bias injection, the ultrasonic signal comprising an audio frequency greater than 20 kHz;

g. combining the ultrasonic signal with the second signal in the amplified electromagnetic network, thereby allowing precise control of an operating point of non-linear hysteresis of the core material, and achieving consistent magnetic field levels across the audio frequency spectrum and controlled distortion behavior across the audio frequency spectrum; and h. recreating the process of AC-bias used to reduce distortion in magnetic tape recording.

* * * * *